US006850491B1

United States Patent
Firoiu et al.

(10) Patent No.: US 6,850,491 B1
(45) Date of Patent: Feb. 1, 2005

(54) MODELING LINK THROUGHPUT IN IP NETWORKS

(75) Inventors: Victor Firoiu, Westford, MA (US); Ikjun Yeom, Malden, MA (US); Xiaohui Zhang, Malden, MA (US)

(73) Assignee: Nortel Networks Limited (CA)

( * ) Notice: Subject to any disclaimer, the term of this patent is extended or adjusted under 35 U.S.C. 154(b) by 865 days.

(21) Appl. No.: 09/751,683

(22) Filed: Dec. 29, 2000

Related U.S. Application Data

(60) Provisional application No. 60/226,751, filed on Aug. 21, 2000.

(51) Int. Cl.[7] .................................................. H04J 1/16
(52) U.S. Cl. ....................................... 370/235; 370/252
(58) Field of Search ............................... 370/235–238, 370/390–392; 234/410, 432, 230, 401, 252; 709/240, 225–228, 250, 236, 238

(56) References Cited

U.S. PATENT DOCUMENTS

| | | | | |
|---|---|---|---|---|
| 6,483,804 B1 | * | 11/2002 | Muller et al. | 370/230 |
| 6,535,518 B1 | * | 3/2003 | Hu et al. | 370/401 |
| 6,556,578 B1 | * | 4/2003 | Silberschatz et al. | 370/412 |
| 6,646,988 B1 | * | 11/2003 | Nandy et al. | 370/235 |

* cited by examiner

*Primary Examiner*—Chi Pham
*Assistant Examiner*—Prenell Jones
(74) *Attorney, Agent, or Firm*—Steubing McGuinness & Manaras LLP

(57) ABSTRACT

A model is given for performance evaluation of IP computer networks that are dominated by congestion-controlled traffic. The model includes heterogeneous TCP flows, UDP flows, short-lived TCP flows, and TCP flows in a differentiated services network. The performance of large-scale networks is estimated where flows may encounter multiple congested links.

80 Claims, 17 Drawing Sheets

A network topology with two bottleneck links

Fig. 1. Measuring RTT in a TCP sender

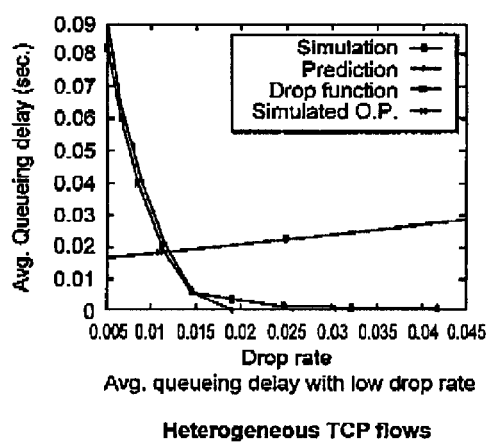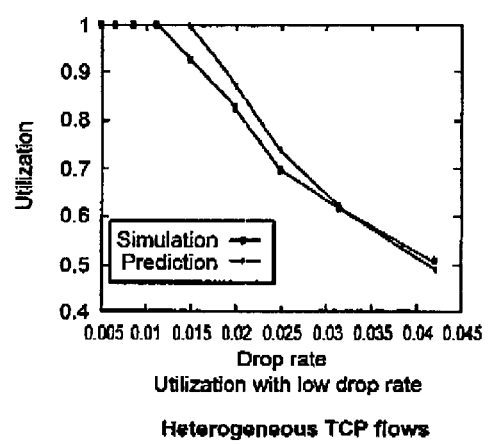
FIG. 3A
FIG. 3B

Avg. queueing delay with high drop rate

Heterogeneous TCP flows

Utilization with high drop rate

Heterogeneous TCP flows

Avg. queueing delay with 10% CBR traffic

Traffic Heterogeneity

Utilization with 10% CBR traffic

Traffic Heterogeneity

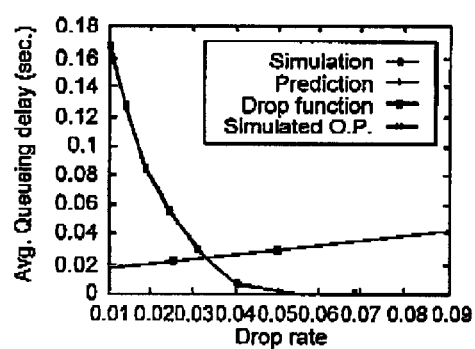 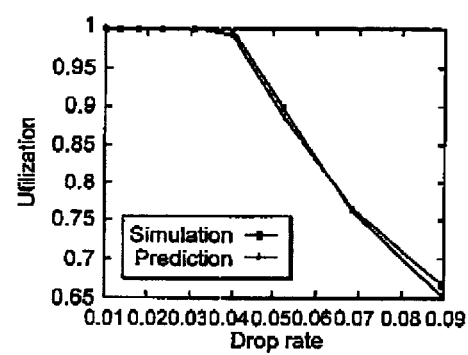
Avg. queueing delay with 30% CBR traffic
Utilization with 30% CBR traffic
Traffic Heterogeneity
Traffic Heterogeneity
FIG. 4C
FIG. 4D Avg. queueing delay with 50% CBR traffic Traffic Heterogeneity Utilization with 50% CBR traffic Traffic Heterogeneity

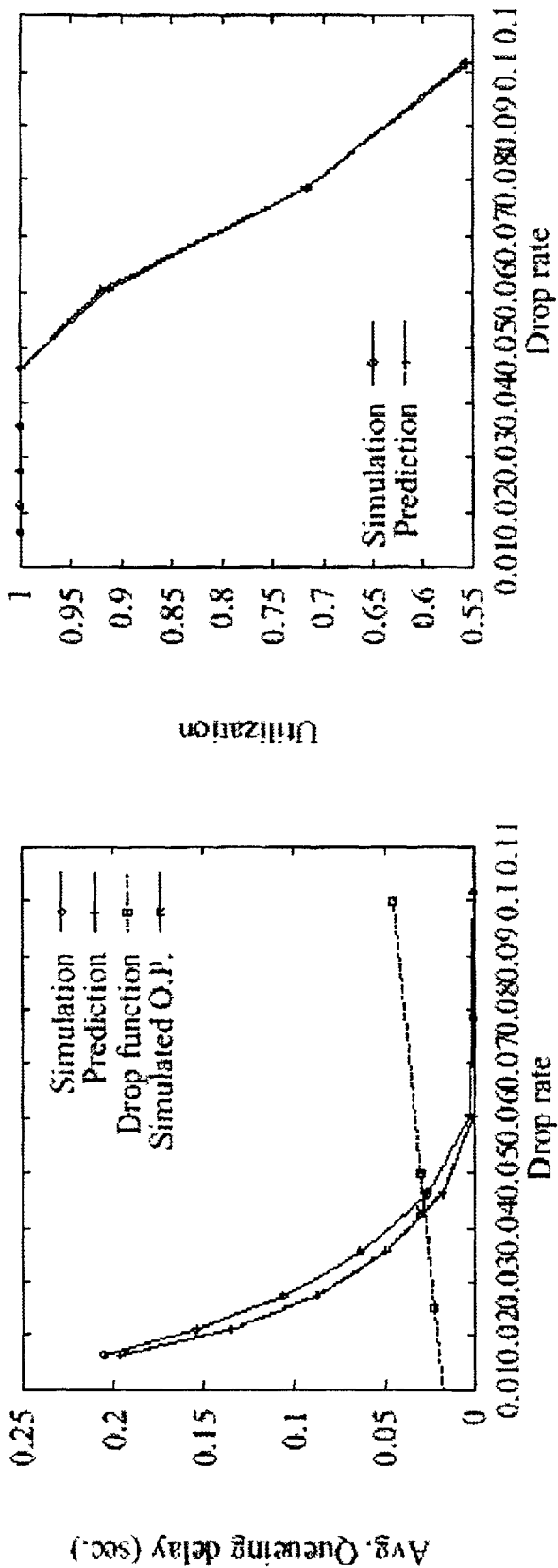
Fig. 5. Heterogeneity of flows' file size
(a) Avg. queueing delay when considering short-lived flows
(b) Utilization when considering short-lived flows

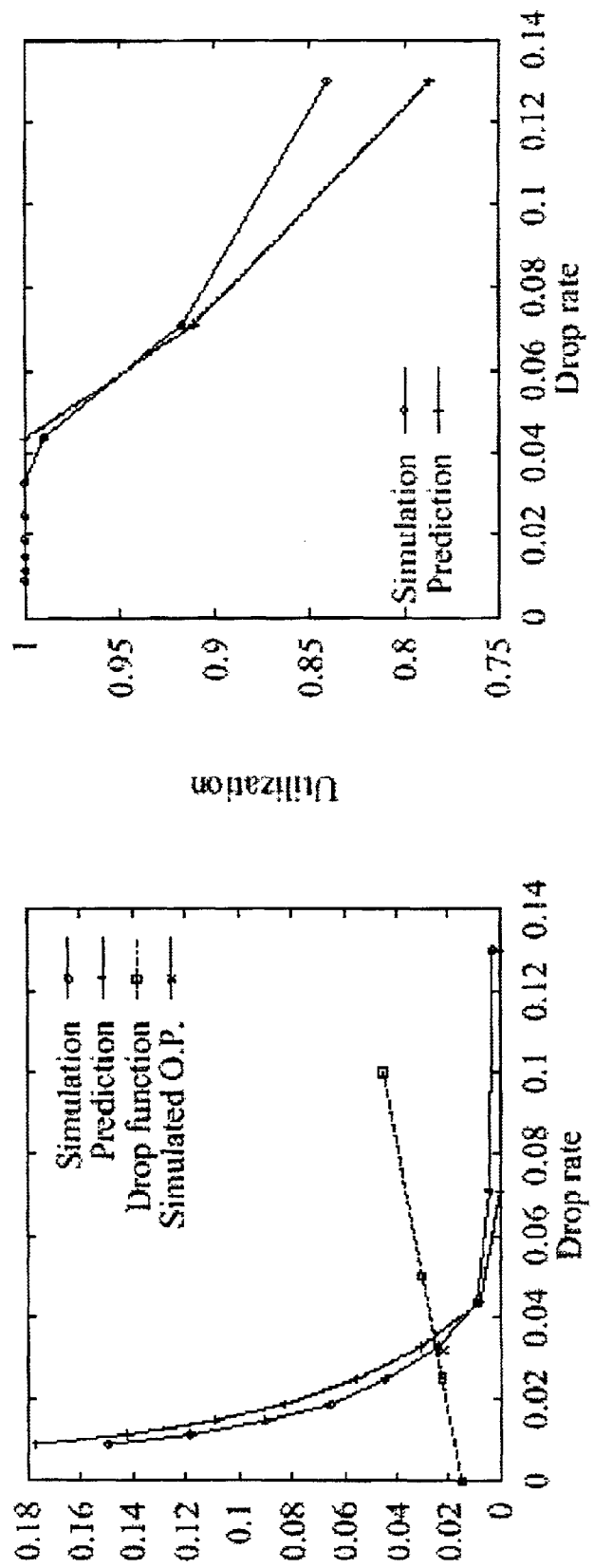
(a) Avg. queueing delay (b) Utilization
Fig. 6. TCP flows in AF PHB

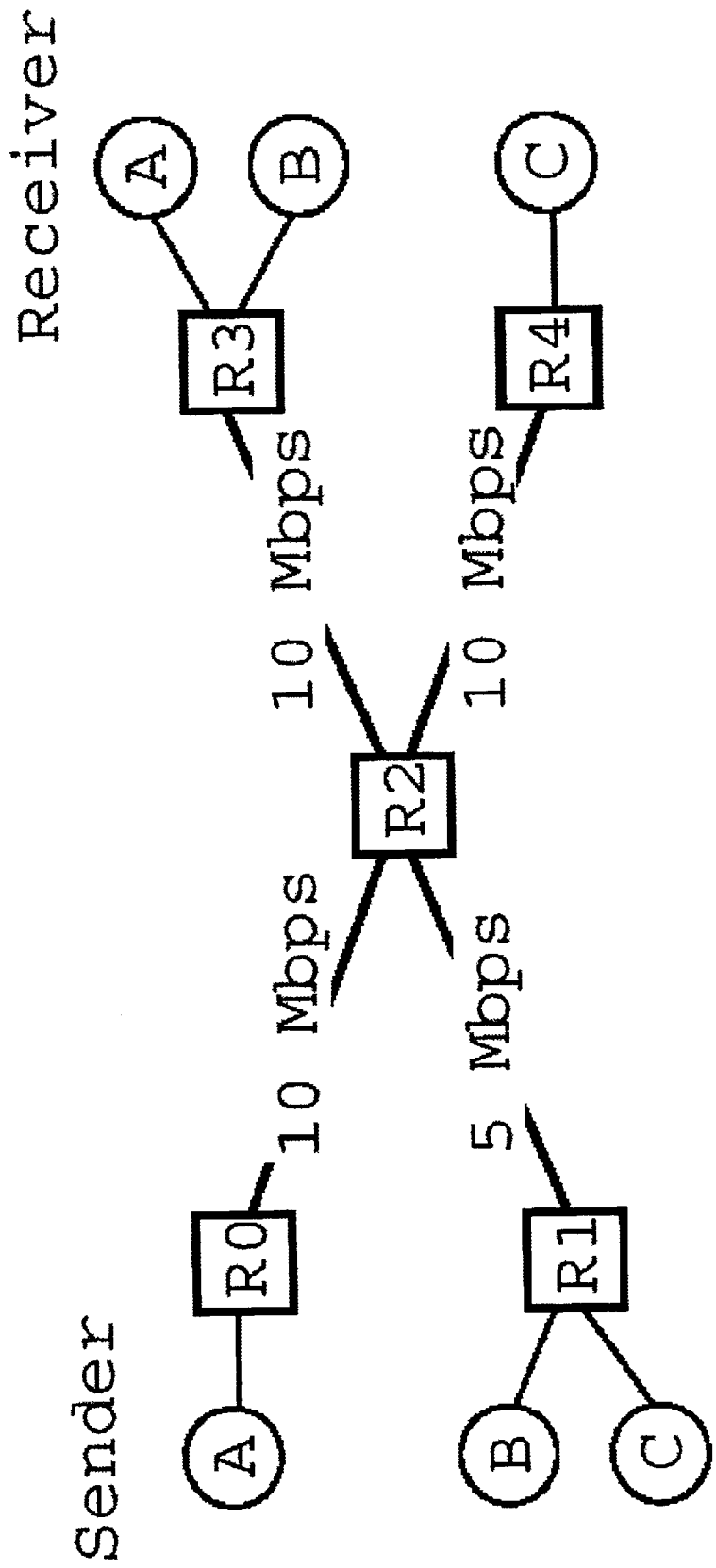
Fig. 7. A network topology with two bottleneck links

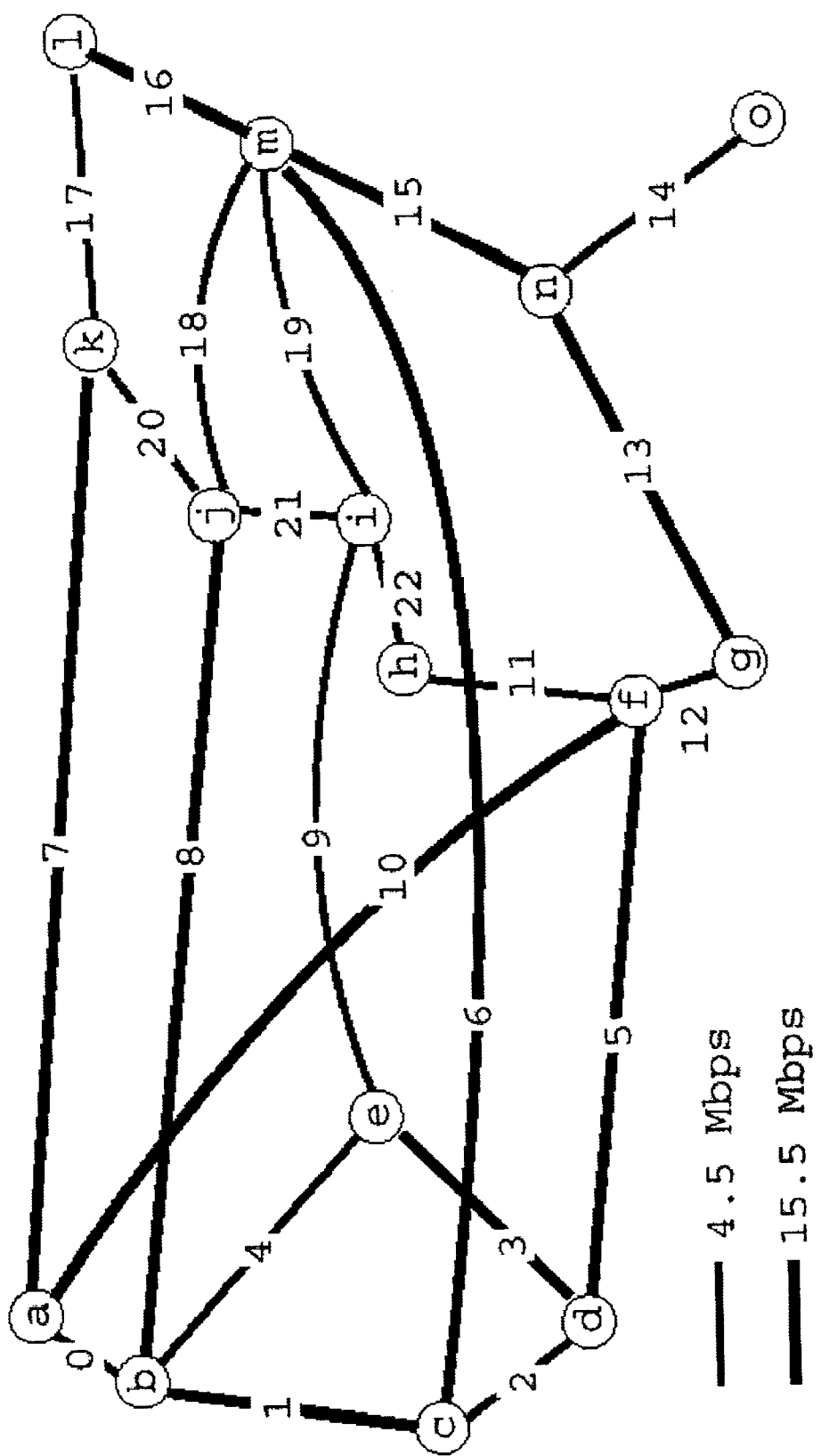
Fig. 8. A large scale network topology

Simulation and prediction with TCP traffic

Simulation and prediction with TCP traffic

Drop rate

Simulation and prediction with TCP traffic

Queueing delay

Simulation and prediction with TCP traffic

Throughput

Measurement and prediction
with TCP and UDP traffic

Histogram of relative error

Measurement and prediction
with TCP and UDP traffic

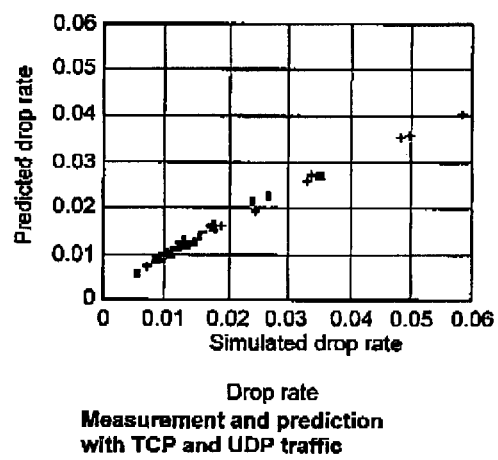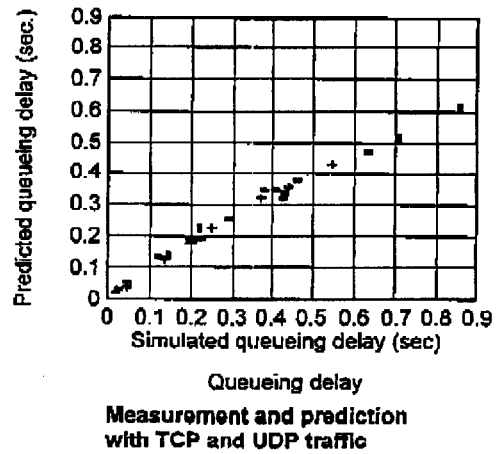
Drop rate
Measurement and prediction
with TCP and UDP traffic
FIG. 10C
Queueing delay
Measurement and prediction
with TCP and UDP traffic
FIG. 10D

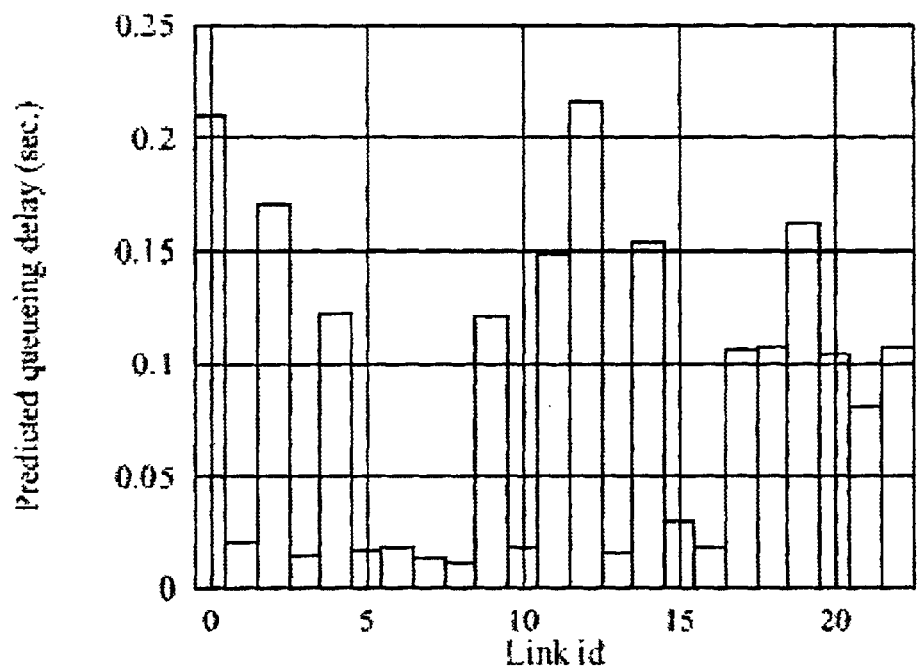
Fig. 11. Queueing delay in each link
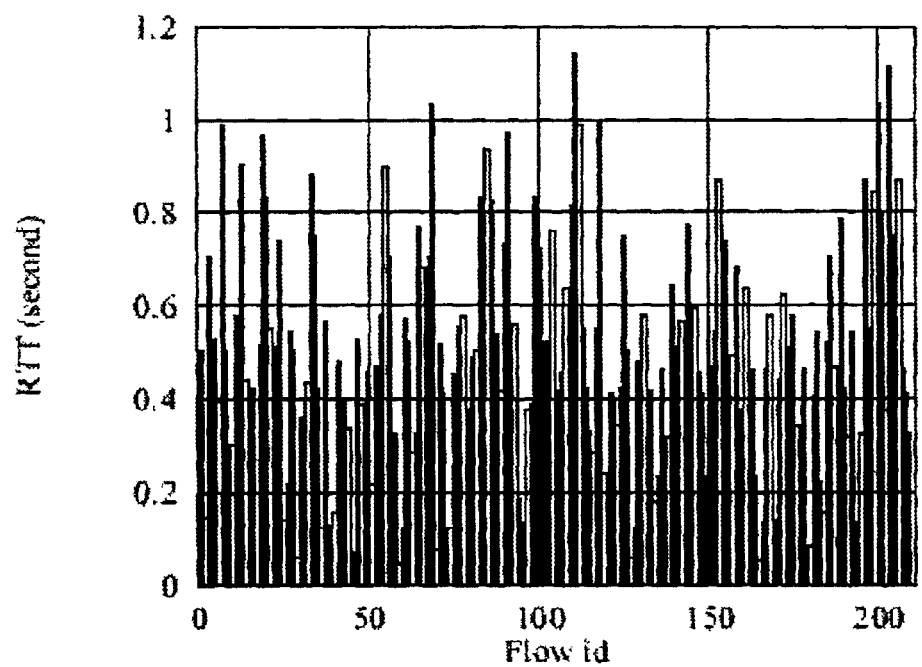
Fig. 12. Predicted RTTs of individual flows

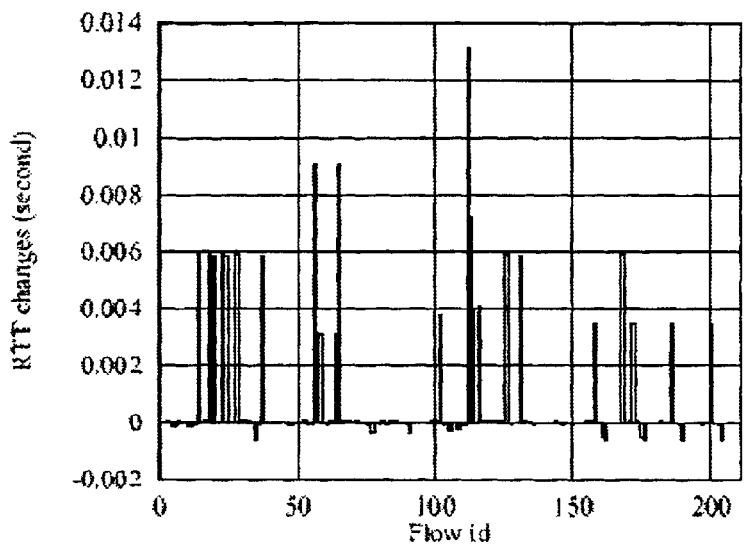
Fig. 13. Predicted RTT changes after establishing the requested connections through {0,4,9} links
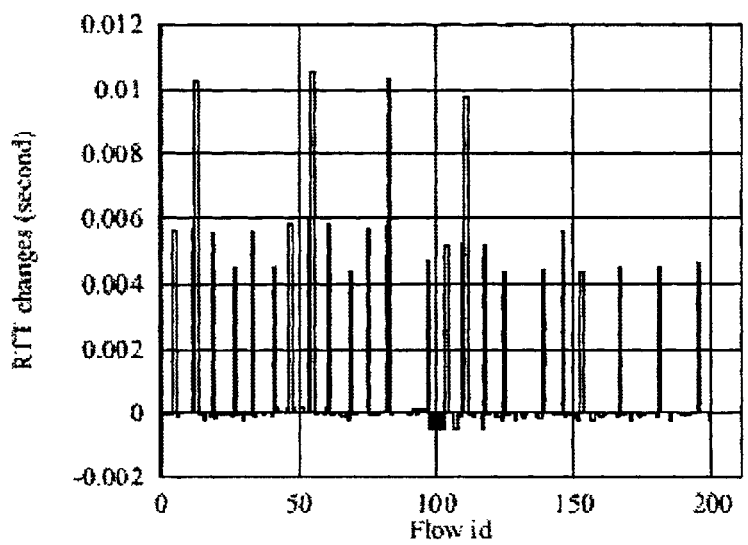
Fig. 14. Predicted RTT changes after establishing the requested connections through {5,12,13,14} links

MODELING LINK THROUGHPUT IN IP NETWORKS

This application claims priority from U.S. provisional patent application No. 60/226,751, filed Aug. 21, 2000, and incorporated herein by reference.

FIELD OF THE INVENTION

The invention generally relates to computer data networks, and more specifically to evaluating performance and traffic engineering of networks.

BACKGROUND ART

Traffic engineering tries to reduce congestion by efficient distribution of computer network traffic. Overall network performance improves when uneven traffic distribution is avoided. Traffic engineering uses an analytic model of network behaviors for proper network dimensioning, network provisioning, and admission control.

Current computer networks suffer from congestion due to increasing traffic. Traffic engineering takes two conceptual approaches to congestion control: (1) congestion control at traffic sources, and (2) queue management in routers.

Congestion control at traffic sources usually focuses on adjusting the sending rate of a flow according to available bandwidth. A flow is considered responsive to congestion when the flow adjusts its sending rate in reaction to packet losses. The most widely used type of responsive flow is based on the Transmission Control Protocol (TCP), which has sophisticated mechanisms for congestion control including slow start, additive increase/multiplicative decrease, timeouts, duplicate ACKs, and other developing techniques.

Another part of congestion control is packet queue management that is associated with a packet drop policy. When the queue build-up at a router exceeds a certain threshold, the router detects this as an indication of congestion and takes a responsive action. Typically, the action is to drop packets. A number of issues are related to drop policy including: congestion control, fairness among flows, and queueing delay. Various approaches to these issues have been suggested including tail drop, random drop, early drop, random early detection (RED), and RED In/Out (RIO).

There is a strong correlation between congestion controls at sources and routers. The drop policy at routers impacts the sending rate at sources, and the reaction of sources to packet losses affects queue build-up at routers. Changes in queue lengths results in changes to drop rates. These interacting effects continue until a network reaches a steady state (if a steady state exists). What the steady state is and how fast it is reached is determined by the congestion control mechanisms at both sources and routers. Thus, network congestion control should be examined and evaluated as an interaction between the source and router congestion control mechanisms. But these mechanisms are complicated, which makes evaluating their interactions quite difficult.

SUMMARY OF THE INVENTION

A representative embodiment of the present invention includes a method of modeling heterogeneous congestion-responsive flows in a computer network having a plurality of links. The method is applied to a given link having a plurality of congestion-responsive flows of varying traffic characteristics. For each individual flow having specific traffic characteristics, a link throughput for the individual flow is determined as a function of packet drop probability and flow round trip time. Then, total flow throughput of the given link is determined by summing the link throughputs of each of the individual flows.

In specific embodiments, the varying traffic characteristics may include packet size, flow window size, flow round trip time (which, for example, may be the greater of system time resolution and actual roundtrip time for the flow), and average number of packets acknowledged by an acknowledgement packet received by a sender of the flow from a receiver of the flow. The average number of packets acknowledged may be a ratio of a total number of packets to the product of a total number of acknowledgement packets times a term adjusting for a probability of an acknowledgement packet being dropped.

In one specific embodiment, the plurality of congestion-responsive flows may include a Transmission Control Protocol (TCP) flow. Also, the given link may further have a plurality of constant bit rate flows and determining total flow throughput of the given link then includes summing each of the constant bit rate flows. The constant bit rate flow may include a User Datagram Protocol (UDP) flow. The TCP flow may include a short-lived TCP flow. The network may be a differentiated services network, or an Internet Protocol (IP) network, or both. The given link may include a Random Early Detection (RED) router.

In a further embodiment, the method includes representing the total flow throughput as a function of packet drop probability and the round trip times of the individual flows. Total flow throughput may also be represented as a function of packet drop probability and average queue size.

The method may also include determining a link equilibrium operating point. This may be determined as an intersection between a function of packet drop probability that represents average queue size and a function of average queue size that represents packet drop probability.

In representative embodiments, the packet drop probability may represent a random early detection (RED) drop function of average queue size for the given link. The flow round trip time then represents a sum of average queue size for the given link and summed propagation delay experienced by the given flow. Or, the packet drop probability may represent a term reflecting a random early detection (RED) drop function of average queue size for each link in the path of the individual flow. The flow round trip time then represents a sum of summed average queue size for each link in the path of the individual flow and summed propagation delay experienced by the given flow.

Any of the foregoing may be implemented in an apparatus that includes a link flow module for modeling heterogeneous congestion-responsive flows. The module includes a link throughput component that determines total flow throughput for a given link having a plurality of congestion-responsive flows of varying traffic characteristics. The link throughput component includes an individual flow unit that, for each individual flow having specific traffic characteristics, determines a link throughput for the individual flow as a function of packet drop probability and flow round trip time. Also, a flow summing unit is in communication with the individual flow unit, and determines total flow throughput of the given link by summing the link throughputs of each of the individual flows.

Alternatively, any of the foregoing methods may be implemented as a computer program product. The computer program product includes a computer usable medium having computer readable program code thereon. The computer readable program code includes program code for determining total flow throughput for a given link having a plurality of congestion-responsive flows of varying traffic characteristics. This includes program code for determining, for each individual flow having specific traffic characteristics, a link throughput for the individual flow as a function of packet drop probability and flow round trip time, and program code for determining total flow throughput of the given link by summing the link throughputs of each of the individual flows.

BRIEF DESCRIPTION OF THE DRAWINGS

The present invention will be more readily understood by reference to the following detailed description taken with the accompanying drawings, in which:

FIG. 5 compares average queueing delay and link utilization for the predictions of a link throughput model and a network simulation of a bottleneck link when considering short-lived TCP flows.

FIG. 6 compares average queueing delay and link utilization for the predictions of a link throughput model and a network simulation of a bottleneck link having differentiated services TCP flows.

FIG. 7 illustrates a network topology with two bottleneck links.

FIG. 8 illustrates a large scale network topology.

FIG. 11 illustrates the predicted queueing delay in each link in a complex multi-link network as shown in FIG. 8.

FIG. 12 illustrates the predicted RTTs of individual flows in a complex multi-link network as shown in FIG. 8.

FIG. 13 illustrates predicted RTT changes after establishing requested connection in a first scenario.

FIG. 14 illustrates predicted RTT changes after establishing requested connection in a second scenario.

DETAILED DESCRIPTION OF SPECIFIC EMBODIMENTS

Usually a link is considered to be a bottleneck when the arrival rate of incoming packets is higher than the departure rate (service rate), and the incoming packets are enqueued. A TCP flow's throughput is typically limited by the outmost bottleneck link, or by the most congested link on its path. Therefore, identifying bottleneck links in a network is an important part of traffic engineering.

Average queueing delay and packet drop rate produced by a link are good indication of the level of congestion, and can be used to identify if the link is a bottleneck in the network. Representative embodiments of the present invention provide an accurate estimate of traffic flow through each link in a given network. Various embodiments of the present invention are directed to techniques for computing average delay and loss rate for given flows, routing, and link characteristics. This enables the identification of bottleneck links in the network. This work is general and easily extensible to various networks as long as a flow throughput model and packet drop function are provided.

Previous models of TCP throughput have failed to take into account two specific traffic factors: (1) estimated round trip time (RTT) of a TCP sender can differ from the actual RTT of that flow, and (2) loss of ACK acknowledgement packets can affect TCP throughput. Taking these factors into account can result in a more accurate TCP throughput model.

The RTT of a TCP flow affects flow throughput in two ways: (1) the ratio of congestion window size increase over time is inversely proportional to RTT, and (2) the timeout timer (RTO) is proportional to RTT. The first of these considerations follows from the congestion window size increasing by one packet at every RTT (to be precise, the increase is by 1/b packets, where b is 1 or 2 as described in more detail later). This RTT represents the time difference between a packet departure and the arrival of its corresponding ACK acknowledgment packet.

The RTO is calculated based on a measured RTT, but the measurement accuracy is limited by the clock resolution of the system. For example, in a Linux system, any RTT measurement comes with a 10 msec accuracy. A TCP throughput model can take into account system time resolution-based inaccuracy.

Let $\Delta$ represent the time resolution of a system, and R and R' be the actual RTT and the measured RTT, respectively. Then, $$R' = \Delta \text{ for } 0 < R < \Delta \qquad (1)$$

Figure 1:
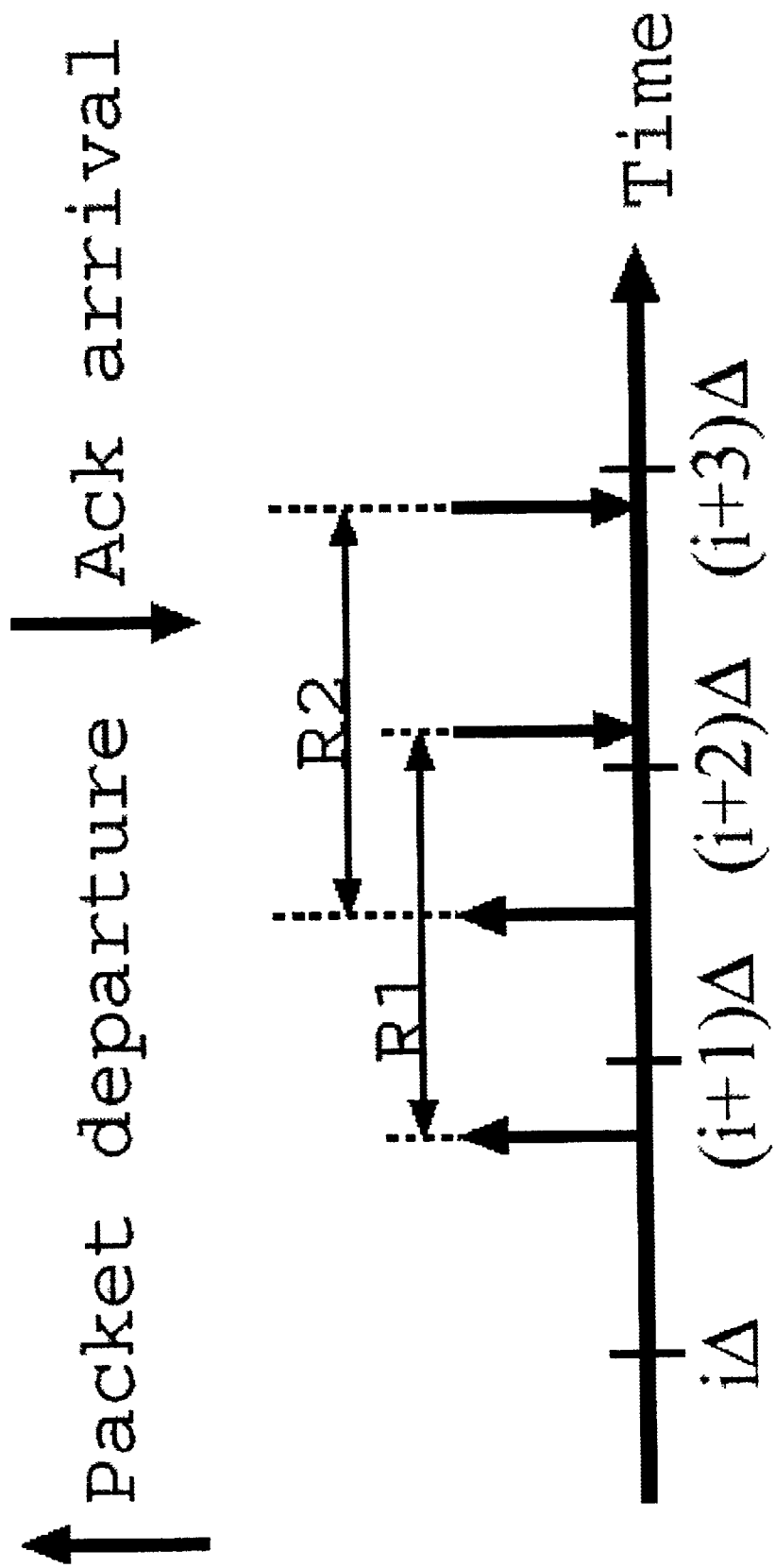
FIG. 1 illustrates measuring Round Trip Time (RTT) of data packets in a TCP sender.

For $\Delta \leq R < 2\Delta$, R' is measured differently depending on packet departure time d as shown in FIG. 1. Let R be $(\Delta + \epsilon)$ for detail. Then, $$R' = \begin{cases} 2\Delta & \text{for } -\epsilon < d < 0 \quad \text{(Refer to R1 in FIG. 1)} \\ \Delta & \text{for } 0 < d < \Delta - \epsilon \quad \text{(Refer to R2 in FIG. 1)} \end{cases}$$

Assuming that d is uniformly distributed in $(-\epsilon, \Delta-\epsilon)$, R' is calculated by:

$$R' = \frac{\epsilon 2\Delta + (\Delta - \epsilon)\Delta}{\Delta} = \Delta + \epsilon \qquad (2)$$

Equations (1) and (2) suggest that the measured RTT be selected as the greater of the system time resolution and actual RTT:

$$R' = \max\{\Delta, R\} \qquad (3)$$

In the following discussions, we use a $\Delta$ of 10 msec.

The second traffic factor to account for in a more accurate TCP throughput model is the effect of the loss of ACK acknowledgment packets. When an ACK acknowledgment for the $i^{th}$ packet is dropped, the next ACK for the $(i+n)^{th}$ packet acknowledges all the previously unacknowledged packets.

Therefore, unlike data packet loss, ACK packet loss is not detected unless a number of ACKs are consecutively dropped and the timeout timer expires.

ACK packet loss affects the rate at which the congestion window cwnd increases. Usually, cwnd increases by 1/cwnd at every ACK arrival. Thus, ACK loss reduces the increase rate of cwnd, and it results in throughput decrease. For example, in J. Padhye, V. Firoiu, D. Towsley, and J. Kurose, "Modeling TCP Throughput: A Simple Model and its Empirical Validation," in Proc. of ACM SIGCOMM, September 1998, pp. 303–314, incorporated herein by reference, and hereinafter "Padhye," the average number of packets acknowledged by an ACK, b, is defined for estimating cwnd. When a receiver employs delayed-ACK, b is usually 2 without considering ACK loss:

$$b = \frac{N_p}{N_a} \tag{3}$$

where $N_p$ and $N_p$ are the total number of packets and the total number of ACKs, respectively. If ACK is dropped with a probability $p_a$, then:

$$b' = \frac{N_p}{(1 p_a)N_a} = \frac{b}{1-p_a} \tag{4}$$

Representative embodiments of the present invention provide a general model for performance evaluation with heterogeneous traffic flows, a much simpler version of which was proposed in V. Firoiu and M. Borden, "A Study of Active Queue Management for Congestion Control," Proc. of IEEE Infocom, March, 2000, incorporated herein by reference, and hereinafter "Firoiu". Initially, the discussion assumes a single bottleneck link such that flows experience queueing delay and packet drop at one link along the path. Other links in the path just add propagation delay. After this single bottleneck model is fully developed, multi-bottleneck networks will be discussed.

Assume that a single bottleneck link with capacity c has $n_t$ congestion-responsive TCP flows $f_i$ ($1 \leq i \leq n_t$) and $n_u$ constant bit-rate UDP flows $u_j$ ($1 \leq j \leq n_u$). The simple TCP throughput model proposed in Padhye was based on a single TCP flow with constant traffic characteristics such as RTT, packet size, and window size. But, for a link having multiple heterogeneous flows with varying traffic characteristics, the $i^{th}$ individual steady state TCP flow for a given link may be modeled as a function of packet drop probability and flow round trip time:

$$t_i(p, R_i) = \begin{cases} \dfrac{M_i\left(\dfrac{1-p}{p} + \dfrac{W(p)}{2} + Q(p, W(p))\right)}{R_i\left(\dfrac{b}{2}W(p)+1\right) + \dfrac{Q(p, W(p))F(p)T_0}{1-p}} & \text{if } W(p) < W_i \\ \dfrac{M_i\left(\dfrac{1-p}{p} + \dfrac{W_i}{2} + Q(p, W_i)\right)}{R_i\left(\dfrac{b}{8}W_i + \dfrac{1-p}{pW_i} + 2\right) + \dfrac{Q(p, W_i)F(p)T_0}{1-p}} & \text{otherwise} \end{cases} \tag{5}$$

where p is the packet drop probability of the link, $R_i$ is the RTT of the $i^{th}$ TCP flow, and the varying traffic characteristics include the packet size $M_i$ of the $i^{th}$ TCP flow, the maximum window size $W_i$ limited by the sender's or receiver's buffer size, and the latency of the first timeout $T_0$ without backoff (usually the order of R' in Equation (3)). W(p) is the window size at the time of loss events and is given by:

$$W(p) = \frac{2+b}{3b} + \sqrt{\frac{8(1-p)}{3bp} + \left(\frac{2+b}{3b}\right)^2} \tag{6}$$

where b is given in Equation (4). Q(p,w) is the probability that a sender detects packet loss by time out, expressed by:

$$Q(p, w) = \min\left\{1, \frac{1+(1-p)^3(1-(1-p)^{w-3})}{(1-(1-p)^w)/(1-(1-p)^3)}\right\} \tag{7}$$

F(p) is the expected number of doubling of $T_0$ by backoff, expressed by:

$$F(p)=1+p+2p^2+4p^3+8p^4+16p^5+32p^6 \tag{8}$$

The throughput of a constant bit-rate (CBR) flow, $r_j$, is simply given by:

$$r_j(p)=(1-p)\lambda_j \tag{9}$$

where $\lambda_j$ is the sending rate of the $j^{th}$ CBR flow. Then, the total throughput T of the link is now a function of packet drop probability p and the set of RTTs of the individual flows that represents the sum of the link throughputs of each of the individual flows:

$$T(p, \{R_i\}) = \sum_{i=1}^{n_t} T_i(p, R_i) + \sum_{j=1}^{n_j} r_j(p) \tag{10}$$

In most drop policies, packet drop rate p is a function of queue length. But, to examine the relationship between queue length and packet drop rate p, we start by assuming that p is independent from the queue length, so that $R_i$ is given by:

$$R_i = R_{0,i} + \bar{q}/c \tag{11}$$

where $R_{0,i}$ is the sum of propagation delay experienced by the $i^{th}$ TCP flow, and $\bar{q}$ is the average queue length of the link. From the assumption that all the flows pass through one bottleneck link, $\bar{q}$ is the same for all flows, and total link throughput $T(p, \{R_i\})$ can be reduced without a loss of generality to $T(p, \bar{q})$ at a given set of delays $\{R_{0,i}\}$ and link capacity c so that total link throughput can be viewed as a function of packet drop probability p and average queue size $\bar{q}$.

An approach similar to the one suggested in Firoiu can determine an optimal drop rate $p_o$ at which $T(p, \bar{q}=0)=c$:

$$p_0 = T_p^{-1}(c, 0) \tag{12}$$

where $T_p^{-1}(c, \bar{q})$ is the inverse of $T(p, \bar{q})$ in p. $T_p^{-1}(c, \bar{q})$ is not resulted in closed form, but $p_o$ can be calculated numerically (e.g., by Newton-Raphson's iteration). Since $\lim_{p \to 0} T(p, \bar{q})=\infty$, $\lim_{p \to 1} T(p, \bar{q})=0$, and $T(p, \bar{q})$ monotonously decreases as p increases for $0 < p \leq 1$ at a given $\bar{q}$ (here $\bar{q}=0$), then there exists a unique $p_o$.

Where $p > p_o$, the link is underutilized, and $\bar{q}=0$. Then, the utilization u(p) is given by:

$$u(p) = \frac{T(p, 0)}{c} \tag{13}$$

When $p \leq p_o$, the link is fully utilized (u(p)=1), $\bar{q}$ is:

$$\bar{q} = T_q^{-1}(p, c) \tag{14}$$

where $T_q^{-1}(p, c)$ is the inverse of $T(p, \bar{q})$ in $\bar{q}$. $T_q^{-1}(p, c)$ is also not a closed form, but $\bar{q}$ can be calculated in the same way as $p_o$. Thus, a link equilibrium operating point is determined as an intersection between a function of packet drop probability that represents average queue size and a function of average queue size that represents packet drop probability.

Figure 2:
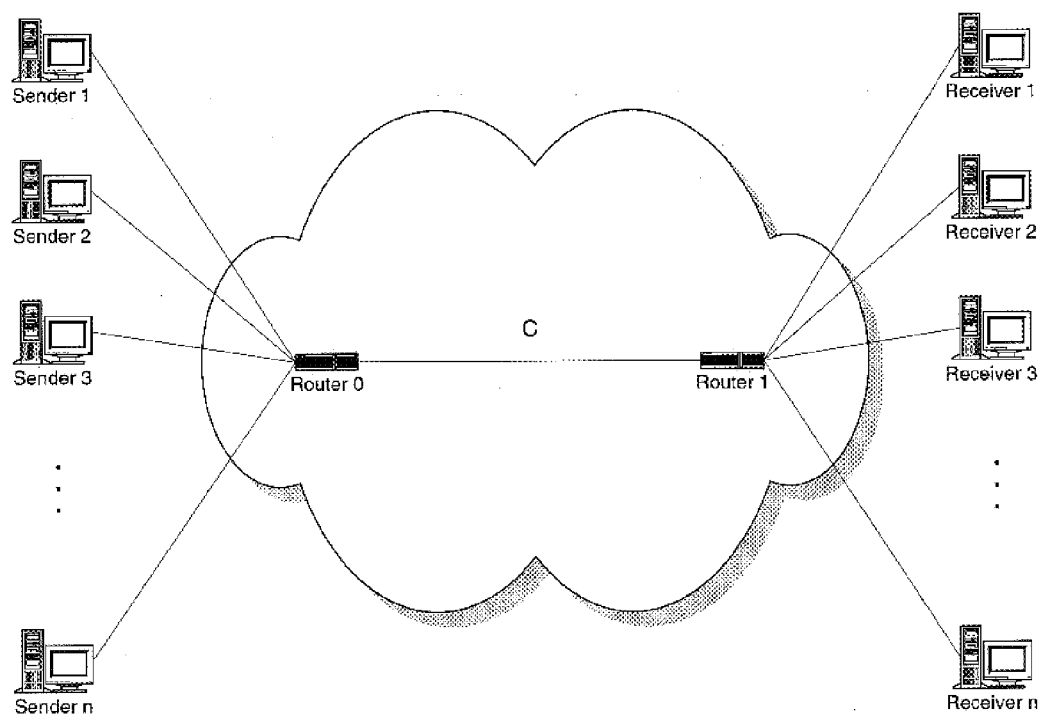
FIG. 2 shows a bottleneck link in a computer network having multiple links.

The foregoing model has been validated by a number of heterogeneous traffic simulations over a topology as shown in FIG. 2. In this topology, the bottleneck link (R0–R1) capacity c is 9 Mbps, and all the access links have enough bandwidth. The Berkeley ns-2 Network Simulator v.2 was used with a fixed drop rate module. For each simulation setup, several simulations were conducted with different drop probabilities p. Each simulation measured the average queueing delay $\bar{q}/c$ and utilization $u(p)$ at the bottleneck link. A simulation was also conducted using RED drop function with {50/150/0.1} for each simulation, and the average operating point was determined.

One set of simulations used heterogeneous TCP flows randomized with respect to: (1) RTT except queueing delay, $R_{0,i}$, is randomly selected from 0.06 to 0.14 seconds, (2) packet size, $M_i$, for each flow is randomly selected from one of $\{2^5, 2^6, 2^7, 2^8, 2^9, 2^{10}\}$ bytes, and (3) maximum window size, $W_i$, is selected from 6 to 50 packets. To observe different drop ranges, two sets of simulations were performed with a different number of flows, 60 and 120 respectively.

Figure 3C:
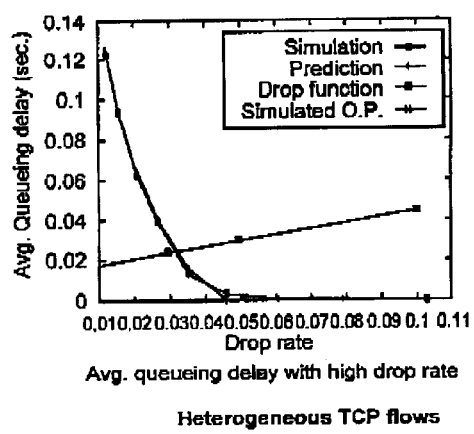
FIG. 3 compares average queueing delay and link utilization for a network simulation of a bottleneck link having heterogeneous TCP flows and the predictions of a link throughput model according to a representative embodiment of the present invention.
Figure 3D:
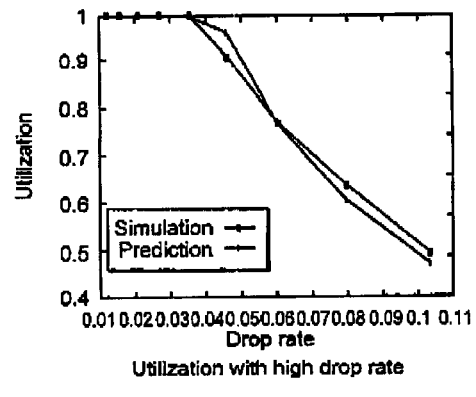
Figure 4A:
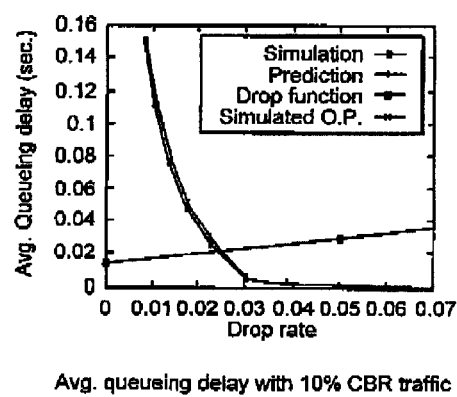
FIG. 4 compares average queueing delay and link utilization for the predictions of a link throughput model and a network simulation of a bottleneck link having a mix of heterogeneous TCP flows and constant bit rate flows.
Figure 4B:
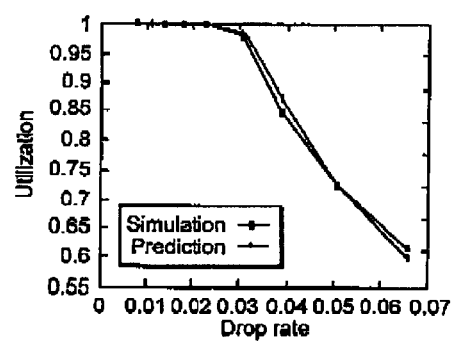
Figure 4E:
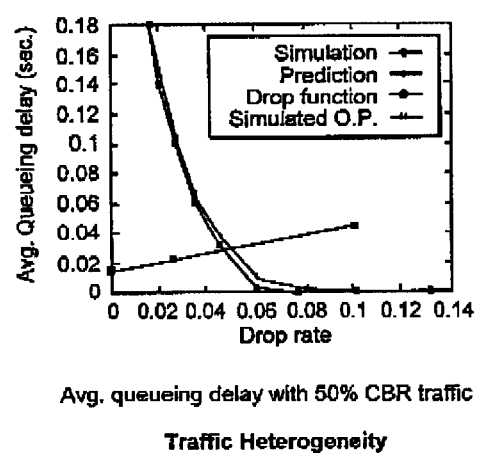
Figure 4F:
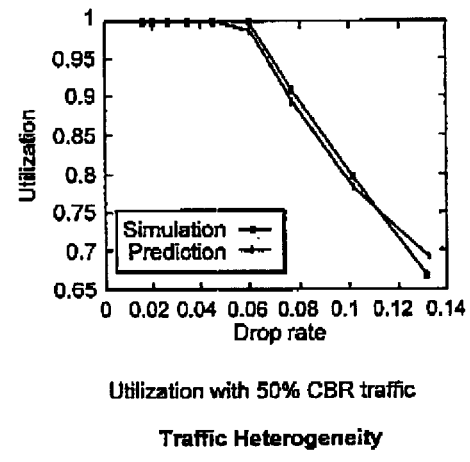

The results are shown in FIG. 3, which confirms the accuracy of the model with respect to queueing delay and utilization for heterogeneous TCP flows. FIG. 3(a) shows average queueing delay as a function of drop rate for relatively low drop rates, and FIG. 3(b) shows the corresponding utilization over the same range of drop rates. FIG. 3(c) shows average queueing delay as a function of drop rate for relatively higher drop rates, and FIG. 3(d) shows the corresponding utilization over the same range of drop rates. In each of these the prediction model tracks very closely with the results of the simulation.

Another set of simulations was performed using both TCP and UDP flows. The TCP flows were as described in the preceding paragraph. For UDP traffic, a number of UDP CBR flows were attached with a 0.1 Mbps sending rate. Packet size of each UDP flow is also randomly selected from one of $\{2^5, 2^6, 2^7, 2^8, 2^9, 2^{10}\}$ bytes to inject general traffic. Three sets of simulations were conducted with different amounts of UDP traffic: 10, 30 and 50% of the bottleneck capacity of 9 Mbps.

The results are shown in FIG. 4, which indicates that the model is still accurate when the traffic is a mix of TCP and UDP flows. FIG. 4(a) shows average queueing delay as a function of drop rate for 10% CBR traffic, and FIG. 4(b) shows the corresponding utilization for the same mix of traffic. FIGS. 4(c) and 4(d) show similar results with 30% CBR traffic, and FIGS. 4(d) and 4(e) show the results for 50% CBR traffic. Once again, in each of these, the prediction model tracks very closely with the results of the simulation. In addition, as UDP traffic increases, queueing delay also increases at the same drop rate since the UDP flows do not respond to packet losses.

The previous simulations assumed that each flow had an infinite amount of data to be transferred. However, as the Internet with HTTP has become widespread, TCP flows have become short. Recent studies have shown that mean size of transferred data by each TCP flow is around 10 KB. To validate the model with more realistic traffic, short-lived TCP flows were also considered.

Instead of modeling individual flow throughput, $t_i(p, R_i)$, according to Equation (5), the throughput model for a short-lived TCP flow was used as proposed in N. Cardwell, S. Savage and T. Anderson, "Modeling TCP Latency," Proceedings of IEEE INFOCOM, Tel Aviv, Israel, March 2000, incorporated herein by reference. This approach models TCP throughput as a function of the amount D of data to be transferred, in addition to the drop probability and RTT:

$$t_i(D_i, p, R_i) = \frac{D_i}{T_{ss} + T_{loss} + T_{ca} + T_{delack}} \quad (15)$$

where $T_{ss}$ is the time spent in initial slow start, $T_{loss}$ is the time caused by the first packet loss followed by the initial slow start, $T_{ca}$ is the time to send the remaining data, and $T_{delack}$ is the TCP latency caused by delayed ACKs.

To generate a simulation of short-lived TCP flows, a random number of packets to be sent from 50 to 200 was elected in each TCP flow. When a flow completed sending the given number of packets, it closed its connection and immediately opened a new connection so that the total number of running flows was maintained. In the specific simulation performed, the number of concurrent TCP flows was 120.

The results when modeling short-lived TCP flows are shown in FIG. 5, which again confirms the basic accuracy of the model. The queueing delay shown in FIG. 5(a) is relatively high compared to FIG. 3(c) at the same drop rate. That is because a TCP sender increases its window size exponentially in slow start period until the first packet loss (in slow start period, the window size increases by one packet at every ACK arrival so that the window size doubles every RTT). This behavior also makes the traffic burstier.

The model has also been applied to a differentiated services network topology. Differentiated services (diff-serv) were introduced to provide different levels of network services to different users. Currently, two per-hop behaviors (PHBs) have been standardized by the Internet Engineering Task Force (IETF). Expedited Forwarding EF PHB provides low delay, low loss rate and guaranteed throughput by explicit resource allocation. Assured Forwarding AF PHB provides different drop rates to packets according to their subscribed level of service.

One specific diff-serv topology that has been verified by our model is an AF PHB with two drop precedences. When a packet enters a diff-serv domain, an edge device marks the packet IN if the current sending rate of the packet's flow is within its contract rate. Otherwise, the packet is marked as OUT. In the domain, an OUT packet is discarded first when congestion occurs. Forwarding of IN packets is protected until every OUT packet is dropped.

A TCP throughput model in a diff-serv network was proposed in I. Yeom and A. L. N. Reddy, Modeling TCP Behavior in a Differentiated-Services Network, Texas A&M Technical Report, May 1999, incorporated herein by reference. In this model, TCP throughput, $t_i(C_i, P_{out}, P_{in}, R_i)$, is defined as a function of its contract rate $C_i$, drop rates of IN and OUT packets $P_{in}$ and $P_{out}$, and RTT $R_i$. For simplicity, it is assumed that $p_{in}=0$. This reduces the model to $t_i(C_i, P_{out}, R_i)$. This model was used (rather than that of Equation (5)) to evaluate performance in a diff-serv network.

In the simulation performed, there were 30 TCP flows with randomly selected contract rates $C_i$ ranging from 0 to 0.5 Mbps. The $\Sigma_i C_i$ is 7.5 Mbps, which is less than the link capacity c of 9 Mbps, so that $t_i > C_i$ and some packets will be marked as OUT. The results are shown in FIG. 6, which confirms that representative embodiments of the model are applicable to AF PHB.

The discussion to this point has presented a traffic performance model at a link queue with heterogeneous traffic when the queue represents the only bottleneck. This model can be extended to a large scale network wherein there are multiple bottlenecks.

First, the TCP throughput model is revised for when the queue employs an RED drop policy. In this approach, packet drop probability p is defined as a function of average queue size $\bar{q}$ for the given link. The drop function of RED $p=H(\bar{q})$ is usually defined as:

$$H(\bar{q}) = \begin{cases} 0 & \bar{q} < q_{\min} \\ \frac{p_{\max}}{q_{\max} - q_{\min}}(\bar{q} - q_{\min}) & q_{\min} \leq \bar{q} \leq q_{\max} \\ 1 & q_{\max} < \bar{q} \end{cases} \quad (16)$$

where $q_{min}$, $q_{max}$, and $p_{max}$ are configurable RED parameters. From this, individual flow throughput, $t_i(p, R_i)$ presented in Equation (5) is revised as:

$$t_i(p, R_i) = t_i(H(\bar{q}), R_{i,0} + \bar{q}) \quad (17)$$

If the flow experiences multiple bottlenecks, that is it observes packet losses and queueing delays at more than one link, then:

$$t_i(p, R_i) = t_i\left(p', R_{i,0} + \sum_m \bar{q}_m\right) \quad (18)$$

where $\bar{q}_m$ is the average queue length of the $m^{th}$ link on the $i_{th}$ flow's path, and p' is the overall drop rate observed by the flow and represents a term reflecting the RED drop function $H(\bar{q})$ of average queue size for each link in the path of the individual flow:

$$p' = 1 - \prod_m (1 - H(\bar{q}_m)) \quad (19)$$

The flow round trip time $R_i$ represents a sum of summed average queue size for each link in the path of the individual flow and summed propagation delay experienced by the given flow. From Equations (18) and (19), Equation (18) can be reduced to $t_i(\{\bar{q}_k\})$ at a given $R_{i,0}$ and a set of $H(\bar{q})$ without loss of generality.

A network model may now be considered where the network consists of a set of TCP flows $\{f_i\}$ where $1 \leq i \leq n_f$, a set of constant bit-rate UDP flows $\{u_j\}$ where $1 \leq j \leq n_u$, and a set of links $\{l_k\}$ where $1 \leq k \leq n_l$. Each TCP flow $f_i$ has a set of parameters $\{M, W, \{l_m\}\}_i$ where M is the packet size, W is the maximum window size, and $\{l_m\}$ is the set of links through which the flow passes. Each UDP flow $u_j$ has a set of parameters $\{\lambda, \{l_m\}\}_j$ where $\lambda$ is the sending rate, and $\{l_m\}$ is the link path. Each link $l_k$ has a set of parameters $\{c, H(\bar{q}), R_0, \{f_i\}, \{u_j\}\}_k$ where c is the link capacity, $H(\bar{q})$ is the drop function, $R_0$ is the propagation delay, and $\{f_i\}$ and $\{u_j\}$ are the set of TCP and UDP flows going through this link. With this network model, from Equation (10), the total throughput of the $k^{th}$ link is given by:

$$T_k(\{\{\bar{q}_m\}_{i,j}\}_k) = \sum_i^{(f_i)_k} t_i(\{\bar{q}_k\}) + \sum_j^{(u_j)_k} r_j(p') \quad (20)$$

where p' is given by Equation (19). Thus, link throughput of a given link is a function of a set of average queue sizes for paths of the flows through the given link. This function represents the sum of: (1) a sum of the individual heterogeneous TCP flows through the given link, where each term in the sum is a function of a set of average queue sizes for each of the links, and (2) a sum of the individual constant bit rate flows through the given link, where each term in the sum is a function of a term reflecting a random early detection (RED) drop function of average queue size for each link in the path of the individual constant bit rate flow.

From this network model, a set of average queue lengths at each link in the network may be determined $\{\bar{q}_k\}$ such that the link throughput for each link is less than or equal to a maximum flow capacity for that link:

$$T_k(\{\{\bar{q}_m\}_{i,j}\}_k) \leq c_k \quad (21)$$

for all k ($1 \leq k \leq n_l$), and maximizing $t_i(\{\bar{q}_m\})$.

The problem may be approached in several ways; we have chosen a numerical approach. This approach divides the problem into two parts, and provides solutions for each part as follows.

First, an initial set of average queue lengths is found $\{\bar{q}_{k,0}\}$ which meet the condition of Equation (21). To determine this initial set, it is assumed that each link produces the only bottleneck to all flows that pass through that link. Then the problem is reduced to a problem with a single bottleneck link as follows:

$$\sum_i^{(f_i)_k} t_i(\bar{q}_{k,0}) + \sum_j^{(u_j)_k} r_j(H(\bar{q}_{k,0})) = c_k \quad (22)$$

This has been shown to be solvable for $1 \leq k \leq n_l$ in the previous discussion of modeling a single bottleneck link.

It can be shown that $\{\bar{q}_{k,0}\}$ is a solution to meet the condition of Equation (21). When a link produces the only bottleneck, then:

$$T_k(\{\{\bar{q}_m\}_{i,j}\}_k) = T_k(\{\bar{q}_{k,0}\}_{i,j})$$

$$= \sum_i^{(f_i)_k} t_i(\bar{q}_{k,0}) + \sum_j^{(u_j)_k} r_j(H(\bar{q}_{k,0})) = c_k$$

On the other hand, when a link is not the only bottleneck, then:

$$T_k(\{\{\bar{q}_m\}_{i,j}\}_k) = \sum_i^{(f_i)_k} t_i\left(1 - \prod_k (1 - H(\bar{q}_{k,0})), R_{i,0} + \sum_k \bar{q}_{k,0}\right) +$$

$$\sum_j^{(u_j)_k} r_j\left(1 - \prod_k (1 - H(\bar{q}_{k,0}))\right)$$

$$\leq \sum_i^{(f_i)_k} t_i(H(\bar{q}_{k,0}), \bar{q}_{k,0}) + \sum_j^{(u_j)_k} r_j(H(\bar{q}_{k,0})) = c_k$$

where Equation (18) is used instead of $t_i(\{\bar{q}_m\})$. Therefore, $\{\bar{q}_{k,0}\}$ satisfies the condition.

Once the initial set of average queue lengths $\{\bar{q}_{k,0}\}$ is found, then the flow throughput of each link $t_i(\{\bar{q}_k\})$ is maximized. Starting from $\{\bar{q}_k\} = \{\bar{q}_{k,0}\}$, each link throughput $t_i(\{\bar{q}_k\})$ is maximized through decreasing $\{\bar{q}_k\}$ by numerical iteration. Each iteration updates:

$$\overline{q}_{k,n+1} = \frac{T_k\left(\{\{\overline{q}_{m,n}\}_{i,j}\}_{k,n}\right)}{c_k}\overline{q}_{k,n}$$

and the process continues until:

$$\sqrt{\sum_{k=1}^{n_l}(\overline{q}_{k,n+1}-\overline{q}_{k,n})^2} < \delta\sqrt{\sum_{k=1}^{n_l}\overline{q}_{k,n}^2}$$

where δ is a configurable parameter to determine accuracy.

It should be noted that the solution that is determined as described above may not be unique. For example, consider a network model in which there are two identical links connected to each other, and every flow in the network passes both links. If there is a solution $\{\overline{q}_0, \overline{q}_l\}$, then $\{\overline{q}_l, \overline{q}_0\}$ is also a solution since the two links are identical.

This network model has been tested by a number of simulations. First, a network with two bottleneck links was considered, based on a topology as shown in FIG. 7. Three sets of TCP flows, A, B and C send packets through {R0, R2, R3}, {R1, R2, R3}, and {R1, R2, R4} respectively. FIG. 7 shows that there are two bottleneck links, R1~R2 and R2~R3. A and B share R2~R3, and B and C share R1~R2.

To assess the throughput of flows and queue length of the links, a simulation was conducted using the Berkeley ns-2 Network Simulator v.2. In the simulation, each set had 20 TCP flows, packet size was 1 KB, and window size $W_i$ is infinite. Propagation delay for each link is 5 msec, and the RED parameter is {0/300/0.1} for $\{q_{min}, q_{max}, p_{max}\}$. The results are shown in Tables 1 and 2.

TABLE 1

Drop Rate and Queue Delay at Bottleneck Links

| | Link | | | |
|---|---|---|---|---|
| | R1~R2 | | R2~R3 | |
| | p | $\overline{q}/c$ | p | $\overline{q}/c$ |
| Simulation | 0.0288 | 0.1382 | 0.0197 | 0.0473 |
| Initial Prediction | 0.0379 | 0.1819 | 0.0324 | 0.0778 |
| Final Prediction | 0.0319 | 0.1532 | 0.0220 | 0.0528 |

TABLE 2

Throughput of Flows (Mbps)

| Flow Set | A | B | C |
|---|---|---|---|
| Simulation | 8.30 | 1.68 | 3.27 |
| Initial Prediction | 2.60 | 1.11 | 1.51 |
| Final Prediction | 8.30 | 1.70 | 3.30 |

In Table 2, throughput is the total sum of 20 flows within each set. "Initial Prediction" in each table indicates the initial values obtained from the first step of the model. Clearly, the values of the initial prediction meet the condition of Equation (21). From these values, the second step proceeds with decreasing $\overline{q}$. "Final Prediction" in each table shows the results. In this process, it took 32 iterations to converge until δ=0.0001. The results show that the proposed approach can predict both queue length and throughput accurately.

Another simulation was performed with a larger network as shown in FIG. 8 having 15 nodes and 23 links. Each link capacity is given by 15.5 or 4.5 Mbps as shown. RED parameter is {0/300/0.1} for 15.5 Mbps links. For 4.5 Mbps links, the RED parameter is set to {0/500/0.1} so that the links can resolve the burst traffic from 15.5 Mbps links without forced drop (i.e., without packet drop with p=1 when $\overline{q} > q_{max}$). Propagation delay for each link is set to 20 msec for relatively long links (e.g., links 6, 7, 8, . . . ) and 10 msec for short links (e.g., links 0, 1, 2, 3, . . . ). In this topology, each node establishes a set of connections to all the other nodes. For example, node a sends packets to node b~o. Each set consists of 9 TCP flows, so that there are 1890 total flows (15×14×9). In the simulation, window size $W_i$ is randomly selected from 6 to 50 packets, and packet size is 1 KB. Throughput of each flow was measured, $\overline{q}$ and p for both directions of each link.

When evaluating the model using this approach, the effect of the reverse path (the ACKs path) should be considered since the reverse path is also used by other flows. There are two potential impacts: queueing delay and ACK loss. To account for ACK loss the technique described with respect to Equation (4) was used, and the queueing delay observed by the ACKs was simply added to the RTT of that flow.

Figure 9A:
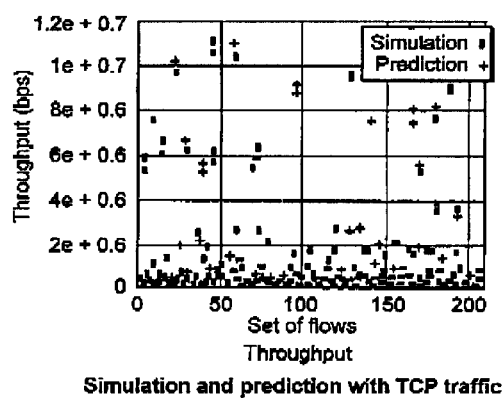
FIG. 9 compares simulated and predicted traffic in a complex multi-link network having multiple heterogeneous TCP flows.
Figure 9B:
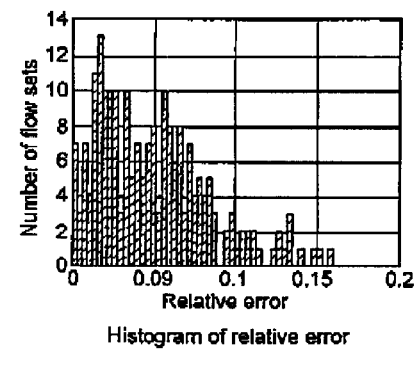

FIG. 9(a) presents simulated and predicted throughput of each flow set, which is the sum of 9 flows with the same source and destination. This histogram of throughput as a function of flow sets (in bps) shows that prediction of flows with relatively low throughput is very accurate. For flows with high throughput, it is observed that prediction is higher than simulation, but still fairly accurate. FIG. 9(b) shows a histogram of the number of flow sets at various relative errors (which are defined as (Simulation-Prediction)/Simulation). This clearly indicates that most errors are less than 10%.

Figure 9C:
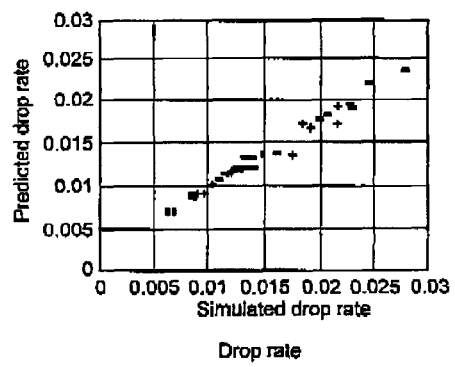
Figure 9D:
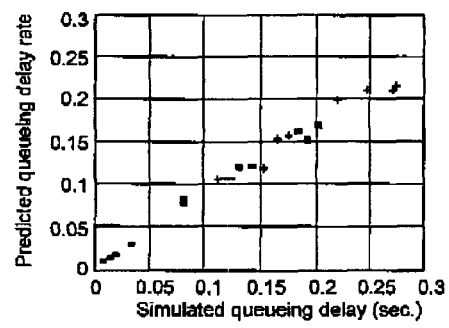

Drop rate and queueing delay are also presented in FIGS. 9(c) and 9(d) respectively. In each figure, the x-axis shows simulated values, and the y-axis shows predicted values. Thus, each point represents simulated and predicted values of a direction of each link. A total of 29 points are presented in each figure. The link corresponding to each point is not specified because it gives no better understanding of the results. x=y is the ideal case. It is shown that predictions of low drop rate (less than 0.015) in FIG. 9(c) and small delay (less than 0.1 sec) are very close to simulated results. For higher drop rate and larger queueing delay, the prediction is slightly less than the simulation.

Because this network model is based on TCP flow throughput (from Equation (5)), the model's accuracy is highly dependent on the accuracy of the flow throughput model. The results shown in FIG. 9(a) indicate that the throughput of individual flows is slightly overestimated. This overestimation in throughput results in underestimation of queueing delay and drop rate as shown in FIG. 9. Prediction performance can be improved by further refining the TCP throughput model, for example, based on a better understanding of timeouts.

Figure 10A:
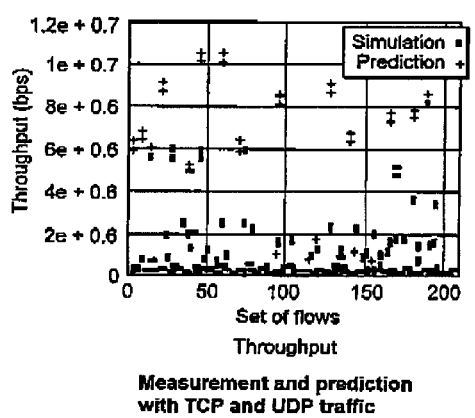
FIG. 10 compares simulated and predicted traffic in a complex multi-link network as shown in FIG. 8 having a mix of heterogeneous TCP flows and Constant bit rate flows.
Figure 10B:
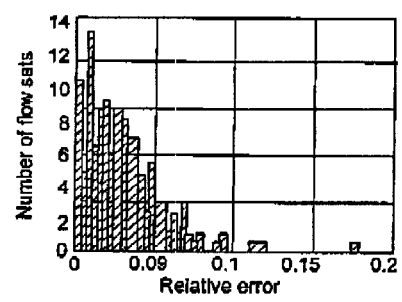

FIG. 10 presents the results of another simulation study with UDP flows. All the simulation setup is the same as the previous one except that $q_{max}$ for each link is randomly selected from 300 to 600 packets, and one UDP flow is added to each flow set. There are 210 UDP flows in the network, and the sending rate of each UDP flow is randomly selected from 0.5 to 1.5 Mbps.

FIG. 10(a) shows that the throughput of TCP flows is reduced by UDP flow, and that the prediction is still accurate in the presence of UDP flows and heterogeneous $q_{max}$ (98% of relative error is less than 20% and 84% is less than 10%, referring to FIG. 10(*b*)). In FIGS. 10(*c*) and 10(*d*), drop rates and queueing delays are seen to increase because of UDP flows, and the prediction is qualitatively accurate. FIG. 11 shows predicted queueing delay of each link in FIG. 8.

As multimedia/real-time application become more popular, end-to-end packet delay becomes important. It is known that bounded delay service is difficult to provide without admission control and explicit resource allocation. The framework provided by representative embodiments can be effectively used for admission control.

For example, for the network described with respect to FIG. 8, average RTT of each flow is estimated in FIG. 12. This shows that the maximum RTT is quoted to be 1.14 sec for the $111^{th}$ flow, which sends packets from node h to node o through {11,12,13,14} links. Admission control can be performed for this given network, and the average RTTs of every flow can be required to be less than or equal to 1.14 sec.

If a connection request is made for 5 TCP flows from node a to node i through {0,4,9} links, then FIG. 13 shows the predicted RTT changes caused by the requested connections from as in FIG. 12. As a result, the maximum RTT is still 1.14 sec, and the request is accepted. On the other hand, if a connection request is made for 5 TCP flows from node d to node o through {5,12,13,14} links, then FIG. 14 shows the predicted changes in the RTTs upon this request. The RTT of the $111^{th}$ flow is predicted to be 1.15 sec, and the request is declined.

Similarly, admission control can be performed on average drop rate of each flow, average throughput of each flow, and average drop rate and/or queue length at each link.

The network models of representative embodiments is also useful for real time intrusion detection. Network security is becoming an important issue, and intrusion and abuse by malicious users are causing serious problems. At a given network and offered traffic, our models can predict how the network should behave when every user behaves correctly. Therefore, the models can also timely detect misbehaviors of the network due to malicious actions.

The models that have been described may also be useful in combination with ongoing related work in the field of traffic engineering. A number of recent studies have focussed on RED and congestion control. See, for example, S. Floyd and V. Jacobson, "*Random Early Detection Gateways for Congestion Avoidance,*" IEEE/ACM Transactions on Networking, vol.1, August, 1997, incorporated herein by reference. RED problematic configuration under different traffic patterns has been addressed, and a self-tuning mechanism has been proposed in W. Feng, D. D. Kandlur, D. Saha and K. G. Shin, "*A Self Configuring RED Gateway,*" Proc. of IEEE Infocom, March, 1999, incorporated herein by reference. A simple analytic model for RED also has been developed in T. Bonald, M. May and J-C. Bolot, "*Analytic Evaluation of RED Performance,*" Proc. of IEEE Infocom, March, 2000, incorporated herein by reference. Thus, several problems with RED have been addressed such as increasing loss rate of non-bursty traffic, higher number of consecutive packet drops, and increasing delay jitter. Recently, a model for transient analysis of RED routers has been proposed in V. Misra, W. Gong and D. Towsley, "*A Fluid-based Analysis of a Network of AQM Routers Supporting TCP flows with an Application to RED,*" Proc. of ACM SIGCOMM, September, 2000, incorporated herein by reference.

Traffic engineering is focusing on optimizing overall network performance via the measurement, modeling, and control of traffic. Some applications of Multi-Protocol Label Switching (MPLS) to traffic engineering in IP networks have been proposed in D. Awduche, "*MPLS and Traffic Engineering in IP Networks,*" IEEE Communications Magazine, December, 1999, incorporated herein by reference.

Another article, A. Feldmann, A. Greenberg, C. Lund., N. Reingold and Jennifer Rexford, "*NetScope: Traffic Engineering for IP Networks,*" IEEE Network Magazine, special issue on Internet Traffic Engineering, 2000, incorporated herein by reference, described a tool called NetScope for traffic engineering associated with the configuration of intra-domain routing. This tool is useful, but different from embodiments of the present invention, which focus on congestion control, in that NetScope evaluates network performance depending on routing protocol.

Also, representative embodiments of the present invention may evolve to further apply the framework to more complex diff-serv networks. Additional models may also be developed for various drop functions and these may then be applied.

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of modeling heterogeneous congestion-responsive flows in a computer network having a plurality of links, the method comprising:
   for a given link having a plurality of congestion-responsive flows of varying traffic characteristics,
   (i) for each individual flow having specific traffic characteristics, determining a link throughput for the individual flow as a function of packet drop probability and flow round trip time, and
   (ii) determining total flow throughput of the given link by summing the link throughputs of each of the individual flows.

2. A method according to claim 1, wherein the varying traffic characteristics include packet size.

3. A method according to claim 1, wherein the varying traffic characteristics include flow window size.

4. A method according to claim 1, wherein the varying traffic characteristics include flow round trip time.

5. A method according to claim 4, wherein for each flow, the round trip time is the greater of system time resolution and actual roundtrip time for the flow.

6. A method according to claim 1, wherein the varying traffic characteristics include average number of packets acknowledged by an acknowledgement packet received by a sender of the flow from a receiver of the flow.

7. A method according to claim 6, wherein for each flow, the average number of packets acknowledged is a ratio of a total number of packets to the product of a total number of acknowledgement packets times a term adjusting for a probability of an acknowledgement packet being dropped.

8. A method according to claim 1, wherein the plurality of congestion-responsive flows include a Transmission Control Protocol (TCP) flow.

9. A method according to claim 8, wherein the given link further has a plurality of constant bit rate flows and determining total flow throughput of the given link includes summing each of the constant bit rate flows.

10. A method according to claim 9, wherein the constant bit rate flows include a User Datagram Protocol (UDP) flow.

11. A method according to claim 8, wherein the TCP flow is a short-lived TCP flow.

12. A method according to claim 8, wherein the network is a differentiated services network.

13. A method according to claim 1, wherein the network is an Internet Protocol (IP) network.

14. A method according to claim 1, wherein the given link includes a Random Early Detection (RED) router.

15. A method according to claim 1, further comprising:
   representing the total flow throughput as a function of packet drop probability and the round trip times of the individual flows.

16. A method according to claim 1, further comprising:
   representing the total flow throughput as a function of packet drop probability and average queue size.

17. A method according to claim 1, further comprising:
   determining a link equilibrium operating point.

18. A method according to claim 16, wherein the link equilibrium operating point is determined as an intersection between a function of packet drop probability that represents average queue size and a function of average queue size that represents packet drop probability.

19. A method according to claim 1, wherein the packet drop probability represents a random early detection (RED) drop function of average queue size for the given link, and the flow round trip time represents a sum of average queue size for the given link and summed propagation delay experienced by the given flow.

20. A method according to claim 1, wherein the packet drop probability represents a term reflecting a random early detection (RED) drop function of average queue size for each link in the path of the individual flow, and the flow round trip time represents a sum of summed average queue size for each link in the path of the individual flow and summed propagation delay experienced by the given flow.

21. A link flow module for modeling heterogeneous congestion-responsive flows in a computer network having a plurality of links, the module comprising:
   a link throughput component that determines total flow throughput for a given link having a plurality of congestion-responsive flows of varying traffic characteristics, the link throughput component including:
   (i) an individual flow unit that, for each individual flow having specific traffic characteristics, determines a link throughput for the individual flow as a function of packet drop probability and flow round trip time, and
   (ii) a flow summing unit, in communication with the individual flow unit, that determines total flow throughput of the given link by summing the link throughputs of each of the individual flows.

22. A module according to claim 21, wherein the varying traffic characteristics include packet size.

23. A module according to claim 21, wherein the varying traffic characteristics include flow window size.

24. A module according to claim 21, wherein the varying traffic characteristics include flow round trip time.

25. A module according to claim 24, wherein for each flow, the round trip time is the greater of system time resolution and actual roundtrip time for the flow.

26. A module according to claim 21, wherein the varying traffic characteristics include average number of packets acknowledged by an acknowledgement packet received by a sender of the flow from a receiver of the flow.

27. A module according to claim 26, wherein for each flow, the average number of packets acknowledged is a ratio of a total number of packets to the product of a total number of acknowledgement packets times a term adjusting for a probability of an acknowledgement packet being dropped.

28. A model according to claim 21, wherein the plurality of congestion-responsive flows include a Transmission Control Protocol (TCP) flow.

29. A module according to claim 28, wherein the given link further has a plurality of constant bit rate flows and the flow summing unit further sums each of the constant bit rate flows to determine total flow throughput of the given link.

30. A module according to claim 29, wherein the constant bit rate flows include a User Datagram Protocol (UDP) flow.

31. A module according to claim 28, wherein the TCP flow is a short-lived TCP flow.

32. A module according to claim 28, wherein the network is a differentiated services network.

33. A module according to claim 21, wherein the network is an Internet Protocol (IP) network.

34. A module according to claim 21, wherein the given link includes a Random Early Detection (RED) router.

35. A module according to claim 21, wherein the link throughput component further represents the total flow throughput for the given link as a function of packet drop probability and the round trip times of the individual flows.

36. A module according to claim 21, wherein the link throughput component further represents the total flow throughput for the given link as a function of packet drop probability and average queue size.

37. A module according to claim 21, wherein the link throughput component further determines a link equilibrium operating point.

38. A module according to claim 37, wherein the link throughput component determines the link equilibrium operating point as an intersection between a function of packet drop probability that represents average queue size and a function of average queue size that represents packet drop probability.

39. A module according to claim 21, wherein the packet drop probability represents a random early detection (RED) drop function of average queue size for the given link, and the flow round trip time represents a sum of average queue size for the given link and summed propagation delay experienced by the given flow.

40. A module according to claim 21, wherein the packet drop probability represents a term reflecting a random early detection (RED) drop function of average queue size for each link in the path of the individual flow, and the flow round trip time represents a sum of summed average queue size for each link in the path of the individual flow and summed propagation delay experienced by the given flow.

41. A computer program product for use on a computer system for modeling heterogeneous congestion-responsive flows in a computer network having a plurality of links, the computer program product comprising a computer usable medium having computer readable program code thereon, the computer readable program code comprising:
  program code for determining total flow throughput for a given link having a plurality of congestion-responsive flows of varying traffic characteristics, including
  (i) program code for determining, for each individual flow having specific traffic characteristics, a link throughput for the individual flow as a function of packet drop probability and flow round trip time, and
  (ii) program code for determining total flow throughput of the given link by summing the link throughputs of each of the individual flows.

42. A computer program product according to claim 41, wherein the varying traffic characteristics include packet size.

43. A computer program product according to claim 41, wherein the varying traffic characteristics include flow window size.

44. A computer program product according to claim 41, wherein the varying traffic characteristics include flow round trip time.

45. A computer program product according to claim 44, wherein for each flow, the round trip time is the greater of system time resolution and actual roundtrip time for the flow.

46. A computer program product according to claim 41, wherein the varying traffic characteristics include average number of packets acknowledged by an acknowledgement packet received by a sender of the flow from a receiver of the flow.

47. A computer program product according to claim 46, wherein for each flow, the average number of packets acknowledged is a ratio of a total number of packets to the product of a total number of acknowledgement packets times a term adjusting for a probability of an acknowledgement packet being dropped.

48. A computer program product according to claim 41, wherein the plurality of congestion-responsive flows include a Transmission Control Protocol (TCP) flow.

49. A computer program product according to claim 48, wherein the given link further has a plurality of constant bit rate flows and the program code for determining total flow throughput of the given link includes program code for summing each of the constant bit rate flows.

50. A computer program product according to claim 49, wherein the constant bit rate flows include a User Datagram Protocol (UDP) flow.

51. A computer program product according to claim 48, wherein the TCP flow is a short-lived TCP flow.

52. A computer program product according to claim 48, wherein the network is a differentiated services network.

53. A computer program product according to claim 41, wherein the network is an Internet Protocol (IP) network.

54. A computer program product according to claim 41, wherein the given link includes a Random Early Detection (RED) router.

55. A computer program product according to claim 41, further comprising:
  program code for representing the total flow throughput as a function of packet drop probability and the round trip times of the individual flows.

56. A computer program product according to claim 41, further comprising:
  program code for representing the total flow throughput as a function of packet drop probability and average queue size.

57. A computer program product according to claim 41, further comprising:
  program code for determining a link equilibrium operating point.

58. A computer program product according to claim 57, wherein the link equilibrium operating point is determined as an intersection between a function of packet drop probability that represents average queue size and a function of average queue size that represents packet drop probability.

59. A computer program product according to claim 41, wherein the packet drop probability represents a random early detection (RED) drop function of average queue size for the given link, and the flow round trip time represents a sum of average queue size for the given link and summed propagation delay experienced by the given flow.

60. A computer program product according to claim 41, wherein the packet drop probability represents a term reflecting a random early detection (RED) drop function of average queue size for each link in the path of the individual flow, and the flow round trip time represents a sum of summed average queue size for each link in the path of the individual flow and summed propagation delay experienced by the given flow.

61. A link flow module for modeling heterogeneous congestion-responsive flows in a computer network having a plurality of links, the module comprising:
  means for determining total flow throughput for a given link having a plurality of congestion-responsive flows of varying traffic characteristics, the means for determining including:
  (i) means, for each individual flow having specific traffic characteristics, for determining a link throughput for the individual flow as a function of packet drop probability and flow round trip time, and
  (ii) means for summing the link throughputs of each of the individual flows to determine total flow throughput of the given link.

62. A link flow module according to claim 61, wherein the varying traffic characteristics include packet size.

63. A link flow module according to claim 61, wherein the varying traffic characteristics include flow window size.

64. A link flow module according to claim 61, wherein the varying traffic characteristics include flow round trip time.

65. A link flow module according to claim 64, wherein for each flow, the round trip time is the greater of system time resolution and actual roundtrip time for the flow.

66. A link flow module according to claim 61, wherein the varying traffic characteristics include average number of packets acknowledged by an acknowledgement packet received by a sender of the flow from a receiver of the flow.

67. A link flow module according to claim 66, wherein for each flow, the average number of packets acknowledged is a ratio of a total number of packets to the product of a total number of acknowledgement packets times a term adjusting for a probability of an acknowledgement packet being dropped.

68. A link flow module according to claim 61, wherein the plurality of congestion-responsive flows include a Transmission Control Protocol (TCP) flow.

69. A link flow module according to claim 68, wherein the given link further has a plurality of constant bit rate flows and means for determining total flow throughput of the given link includes means for summing each of the constant bit rate flows.

70. A link flow module according to claim 69, wherein the constant bit rate flows include a User Datagram Protocol (UDP) flow.

71. A link flow module according to claim 68, wherein the TCP flow is a short-lived TCP flow.

72. A link flow module according to claim 68, wherein the network is a differentiated services network.

73. A link flow module according to claim 61, wherein the network is an Internet Protocol (IP) network.

74. A link flow module according to claim 61, wherein the given link includes a Random Early Detection (RED) router.

75. A link flow module according to claim 61, further comprising:

means for representing the total flow throughput as a function of packet drop probability and the round trip times of the individual flows.

76. A link flow module according to claim 61, further comprising:

means for representing the total flow throughput as a function of packet drop probability and average queue size.

77. A link flow module according to claim 61, further comprising:

means for determining a link equilibrium operating point.

78. A link flow module according to claim 77, wherein the link equilibrium operating point is determined as an intersection between a function of packet drop probability that represents average queue size and a function of average queue size that represents packet drop probability.

79. A link flow module according to claim 61, wherein the packet drop probability represents a random early detection (RED) drop function of average queue size for the given link, and the flow round trip time represents a sum of average queue size for the given link and summed propagation delay experienced by the given flow.

80. A link flow module according to claim 61, wherein the packet drop probability represents a term reflecting a random early detection (RED) drop function of average queue size for each link in the path of the individual flow, and the flow round trip time represents a sum of summed average queue size for each link in the path of the individual flow and summed propagation delay experienced by the given flow.

* * * * *